Oct. 8, 1968  C. H. BUTTS  3,405,214

MOLDING APPARATUS AND PROCESS

Filed April 8, 1965  3 Sheets-Sheet 1

INVENTORS

CHARLES H. BUTTS

Albert L. Jeffers
Attorney

Oct. 8, 1968 C. H. BUTTS 3,405,214
MOLDING APPARATUS AND PROCESS
Filed April 8, 1965 3 Sheets-Sheet 2

INVENTORS
CHARLES H. BUTTS
Albert L. Jeffers
Attorney

Oct. 8, 1968 C. H. BUTTS 3,405,214
MOLDING APPARATUS AND PROCESS
Filed April 8, 1965 3 Sheets-Sheet 3

INVENTORS
CHARLES H. BUTTS
Albert L. Jeffers
Attorney

United States Patent Office 3,405,214
Patented Oct. 8, 1968

3,405,214
MOLDING APPARATUS AND PROCESS
Charles Homer Butts, Fort Wayne, Ind., assignor to Tri-State Products, Inc., Fort Wayne, Ind., a corporation of Indiana
Filed Apr. 8, 1965, Ser. No. 446,510
8 Claims. (Cl. 264—269)

ABSTRACT OF THE DISCLOSURE

A molding apparatus for a transfer mold or compression mold having a mold plate with a number of spaced openings for receiving a number of inserts, with a dam extending about an arcuate segment of the inner periphery of the insert to cover the split portion of a ring to prevent the occurrence of flash thereby eliminating the requirement for trimming of finishing the article being molded.

---

This invention relates to molding apparatus and process for producing a molded product having an annular reenforcement in the form of a split ring and mold material bonded thereto. An article of the type described, is usable for many different industrial applications for sealing and for general application in hydraulic lines and the like.

In an article of the type described, the split ring is used for reenforcing the article and the mold material which is generally of rubber or other composition, is bonded to the split ring and is used as the sealing material.

In making an article such as the one described, the split portion of the ring becomes an escape for the mold material which after being lost from the mold cavity through said split section, forms an objectionable flash. This flash must then be trimmed from the article before the article is ready for final use. This means that in the manufacture of articles in large quantities, i.e., hundreds of thousands of such articles, a substantial cost saving could be realized by eliminating the occurrence of this flash which heretofore has been found in all of the articles produced by transfer molding or by compression molding.

It is one of the objects of the present invention to eliminate the occurrence of flash when making an article such as the one described.

It is another object of the present invention to provide an apparatus which can make articles having a split annular reenforcement and a moldable material bonded thereto. It is intended that the apparatus be capable of producing thousands of the articles, completely free of flash or other waste sections, and thereby eliminating any requirement for trimming or finishing the article.

It is an important feature of the present invention that a finished article be produced at a lower manufacturing cost because there is no requirement for removing flash from the article after it is removed from the mold; instead, the article is complete, and has a finished dimension upon removal from the mold and does not have to be treated further for any purpose. As a result, the improvement contributes to greater productivity of the article.

Other objects and features of the present invention will become apparent from a consideration of the following description which proceeds with reference to the accompanying drawings, wherein.

Figure 1:
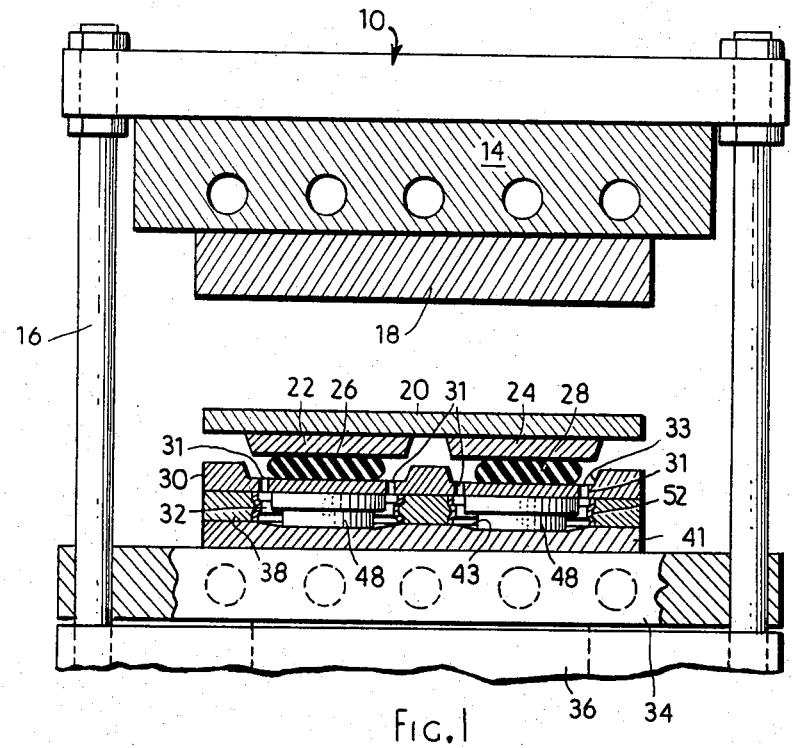
FIGURE 1 illustrates a transfer molding apparatus for producing an article in accordance with the present invention.
Figure 2:
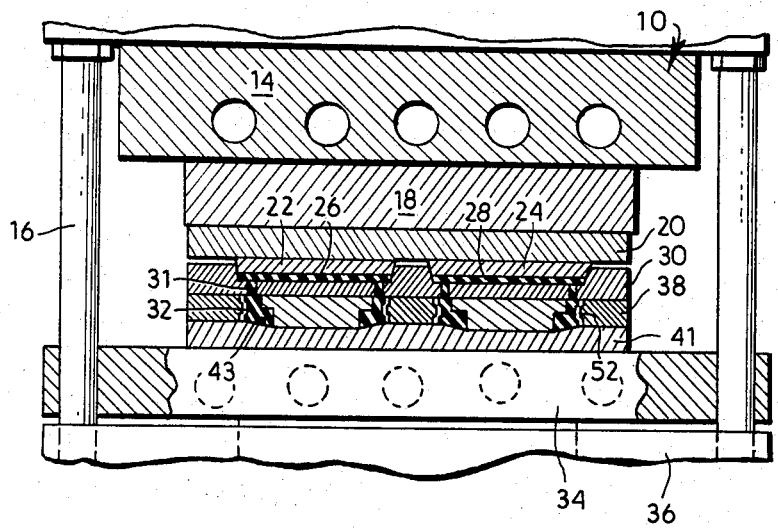
FIGURE 2 illustrates the apparatus of FIGURE 1 with the parts in "closed" position.

Referring now to the drawings, the apparatus designated generally by reference numeral 10, illustrates a transfer molding apparatus. In the drawings there is provided an upper plate 14 which is moved reciprocably on guide rods 16 to bring member 18 downwardly against member 20 having face plates 22 and 24 which correspond to the cavities 33 in the sprue plate 30. The face plates 22 and 24 are adapted to force the moldable material 26 and 28 through the sprue openings 31 into a plurality of mold cavities 32 where the plastic material will conform to the shape desired. The apparatus is held by a lower plate 34 and the entire structure is supported upon a base 36.

Referring next to FIGURES 7–12, the mold includes a cavity or mold plate 38 having a number of spaced openings 40 which are distributed at regular intervals in the mold plate 38. There is received within each opening 40 a mold insert 42 having a dam 44 which extends over a substantially ninety degree quadrant. The mold insert has a flange 46 (FIGURE 8) which enables the mold insert 42 to be held in place.

Figure 4:
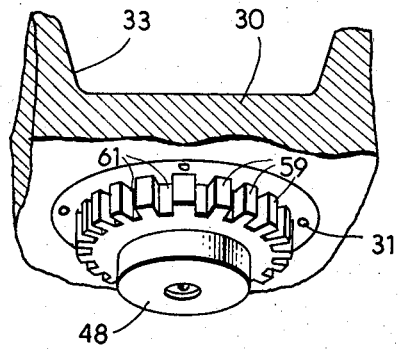
FIGURE 4 is an enlarged isometric detail view looking in the direction of arrows 4—4 of one of the mold members in FIGURE 3 used for making the product.

The other portion of the mold, i.e., the male mold 48 (FIGURE 4) is located within the mold insert 42 and its shape is intended to define a mold cavity into which elastomeric material 26 is forced under transfer molding pressure to fill the mold cavity. The bottom plate 41 is provided with a recess 43 adapted to receive the male mold 48.

Figure 12:
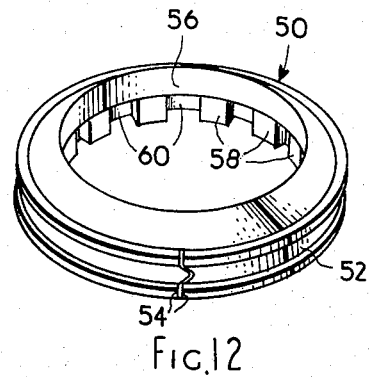
FIGURE 12 is an isometric view of the finished article.

The article produced, FIGURE 12, is designated generally by reference numeral 50 and includes a split ring 52 which is constructed by forming a strip into a circular ring bringing the ends 54 in close proximity to each other. Elastomeric material forms a gasket 56 which is bonded to the ring 52 and has a series of bosses 58 and indentations 60 which correspond with the bosses 59 and indentations 61 on the male mold 48.

In previous practice the elastomeric material, when forced into the mold cavity under pressure, would escape from the mold cavity through the gap between the ends 54 of the annular member 52 and the escaped elastomeric material formed an objectionable flash on the article. This objectionable material had to be trimmed away before the finished product was satisfactory for use and the additional operation added expense to the manufacture of the product.

Figure 10:
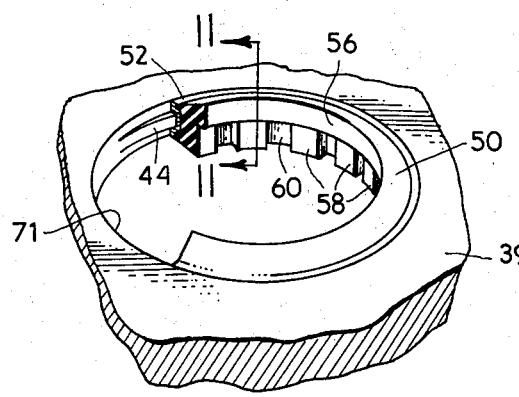
FIGURE 10 illustrates a modification showing the dam forming a part of the mold plate and a cutaway of the finished article contained therein.

As illustrated in FIGURE 10, the dam 44 can be integral with the mold plate 39. This would eliminate the insert 42. In all other respects the dam 44 functions the same as that provided with the insert 42.

In the present invention, the occurrence of this flash is totally eliminated by the dam 44 (FIGURES 8 and 10) which covers the gap between the ends 54 of the ring 52. In the process of making each of the articles 50, the ring 52 is sprung into the opening 70 or 71 (FIGURES 7, 8 and 10) so that the ends 54 are engaged by dam 44 (FIGURES 8 and 10). Thus, when the elastomeric material is forced into the cavity none of the elastomeric material can escape through the gap created by the ends 54 because the dam 44 covers the gap and obstructs any outflow of such elastomeric material.

After the elastomeric material is forced into the die cavity under pressure, as for example, by molding pressure from the upper plate 18, the material is heat treated to polymerize the elastomeric material and bond the same to the ring 52 which is then sprung out of the opening 70. The dam 44, it will be noted, extends over only a segment of the inner periphery of the opening 70 thus permitting the ring 52 to be sprung into and out of the opening 70 or 71 when the article is completed.

The article 50 need not be trimmed after it is removed from the opening 70 but instead, is adapted for immediate use, having the desired configuration, dimension and absence of flash.

Figure 5:
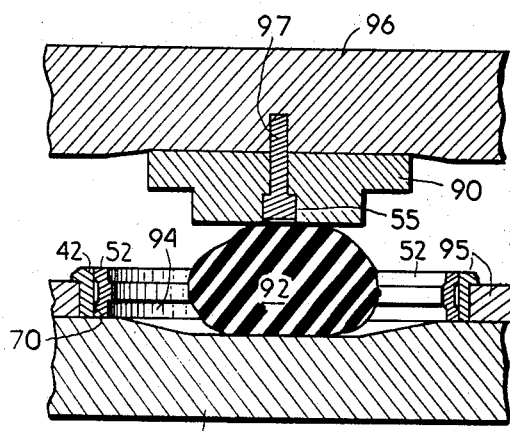
FIGURE 5 is an enlarged detail view showing the mold members used for producing the product by compression molding.

The invention is usable not only with a transfer molding apparatus, but also with a compression molding apparatus such as shown in FIGURE 5. In this apparatus, a series of male molds 90 engage charges of elastomeric material 92, shaping such charges within mold cavities 94, the male molds 90 being carried on a plate 96. After the male molds 90 have engaged the mold material, such material is forced throughout the mold cavity. The male mold member 90 enters the mold cavity and the elastomeric material 92 conforms with the mold cavity to provide the shape of the article.

Figure 6:
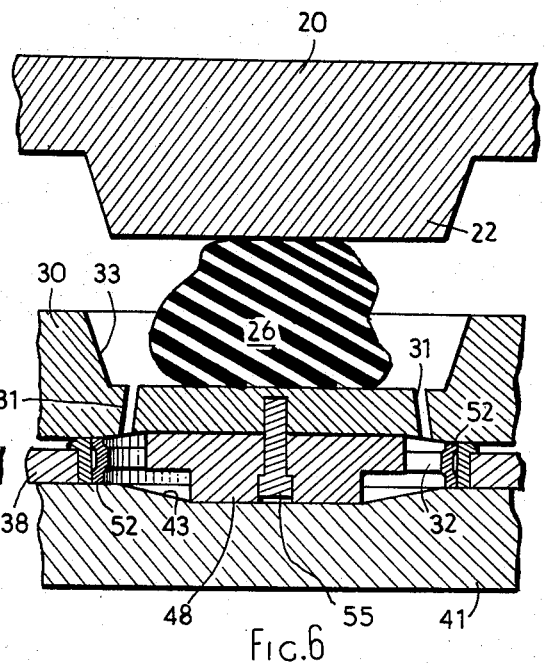
FIGURE 6 is a section view similar to FIGURE 5 but showing the invention in combination with transfer type molding.
Figure 7:
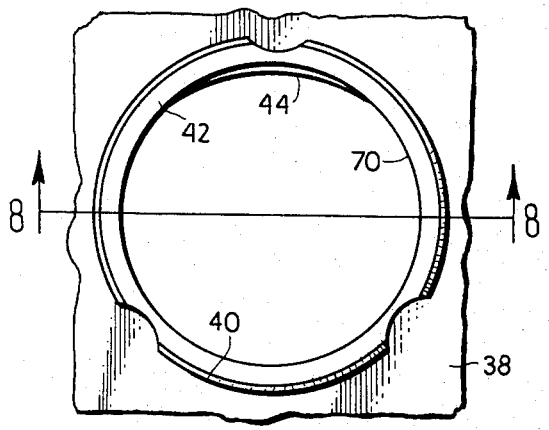
FIGURE 7 is an enlarged detail partial view of the mold plate and mold insert.
Figure 8:
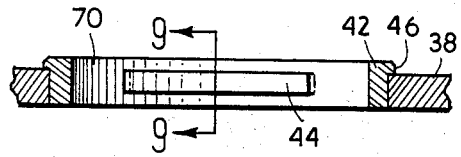
FIGURE 8 is a section view taken on line 8—8 of FIGURE 7.
Figure 9:
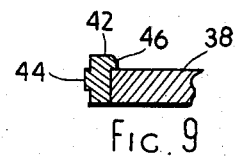
FIGURE 9 is a section view taken on line 9—9 of FIGURE 8.
Figure 11:
FIGURE 11 is a section view taken on line 11—11 of FIGURE 10.

The ring 52 is sprung into opening 70 of the mold plate 95, each opening having an insert 42 with a dam 44 as shown in FIGURES 7 and 8. The male molds 90 are carried on a separate plate 96 and secured thereto by screw 97. Thus, as illustrated in FIGURE 5, compression molding can be used as well as the transfer molding methods illustrated in FIGURE 6. Both methods of molding are equally usable, and one can be substituted for the other with substantially equal results.

Figure 3:
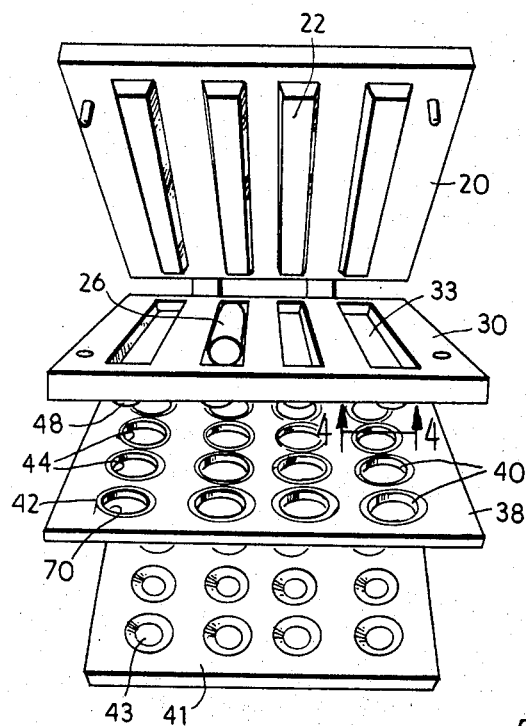
FIGURE 3 is an isometric exploded view of the apparatus for producing products in accordance with the present invention.

In operation, the split ring 52 is sprung into the opening 70 with the ends 54 covered by the dam 44, the dam 44 extending over only a segment of the periphery of the insert 42 to allow this springing in and out as required. After the annular reenforcement ring 52 is in place, the elastomeric material 26 is then transferred under pressure through openings 31 in sprue plate 30 into the mold cavities having the male mold members therein (FIGURES 3 and 6). The elastomeric material is then heat treated to polymerize the material and after such heat treatment, the product is withdrawn by snapping the finished piece out of the opening 70.

In each of the described apparatus, the ends 54 which form the gap of the ring 52 are covered by the dam 44 and not enough of the elastomeric material is permitted to escape to form an objectionable flash or web which needs to be trimmed. Hence, the product is immediately usable and no further processing is required. This produces a product which is substantially more economical to produce having eliminated both the waste of the material and a trimming operation.

Although the present invention has been illustrated and described with certain selected example embodiments, it will be understood that these are illustrative and in no sense restrictive thereof. It is reasonably to be expected that those skilled in this art can make numerous revisions and adaptations of the invention to meet individual design requirements and it is intended that such revisions and adaptations as incorporate the herein disclosed principles will be included within the scope of the following claims as equivalents of the invention.

I claim:

1. Apparatus for producing molded products including a split reenforcement ring and a mold material bonded thereto, comprising a mold plate having spaced openings therein, an insert received within each of the spaced openings of the mold plate, each of said inserts including a dam extending over an angular sector portion of the inner periphery thereof and adapted to coveringly encompass the split portion of said ring which is adapted to be positioned within the insert substantially only with its split portion sealingly encompassed by the dam, a male mold member adapted for location within said ring and forming together with said ring a mold cavity, and means for filling said mold cavity with a moldable material which fills the mold cavity and is bonded to the surrounding ring, said material being confined from radial movement through the split portion of said ring by said dam.

2. Apparatus for producing molded articles having a split annular member and a mold material bonded thereto, comprising a mold cavity plate, an annular insert mounted within said mold cavity plate and having an inner periphery, an arcuate dam extending radially inwardly over an angular sector portion of said inner periphery, said annular member being adapted for insertion within said insert so that substantially only the split portion of said annular member is covered by said dam to prevent movement of the mold material radially outwardly through the split portion, a complementary mold member which extends within said mold cavity to define a spacing corresponding to the shape of the article to be produced, and means for inserting a quantity of moldable material within such spacing to produce an article of the desired configuration.

3. Apparatus for producing an article including a split annular member having a moldable material bonded thereto, comprising a mold plate provided with an opening having an outline which conforms substantially to the outline of said split annular member into which said split annular member is positioned, said mold opening having an inner peripheral surface, a dam of substantially arcuate configuration extending radially inwardly over an angular sector portion of the inner peripheral surface of the mold opening and adapted to coveringly encompass substantially only the split in the split annular member, a mold member adapted to extend into said mold plate opening for defining a mold cavity and means for transferring under pressure a quantity of moldable material into the mold cavity defined by said annular member and said mold member.

4. A process for producing an article comprised of a split ring and an elastomeric material bonded to said ring comprising the steps of: springing the split ring into a mold cavity with the split portion sealingly engaged by an arcuate dam extending radially inwardly over an angular sector portion thereof, disposing a complementary mold member within said ring to define a mold cavity; and, filling the mold with a quantity of moldable material which is bonded to the split ring forming one of the walls of the mold cavity.

5. A process for producing an article comprised of a split ring and an elastomeric material bonded to said ring comprising the steps of: springing the split ring into a mold cavity with the split portion sealingly engaged by an arcuate dam extending radially inwardly over an angular sector portion thereof, disposing a complementary mold member within said ring to define a mold cavity; filling the mold with a quantity of moldable material which is bonded to the split ring forming one of the walls of the mold cavity, and then removing the article from said mold cavity following curing of the elastomeric material in said mold.

6. A process for producing a product having a split ring and a moldable material which is bonded thereto, comprising the steps of press fitting said ring into a mold cavity having a dam which is formed as an arcuate segment covering the split portion of said ring, disposing a mold member radially inwardly of said ring and having a mold face which corresponds with the product to be produced, and forcing a moldable material within the space provided between said mold member and ring to effect shaping and bonding of the molding material to the inner periphery of said split ring, such material being confined from outflow through the split portion of said ring by means of said dam.

7. A process for producing a product having a split ring and a moldable material which is bonded thereto, comprising the steps of press fitting said ring into a mold cavity having a dam which is formed as an arcuate segment covering the split portion of said ring, disposing a mold member radially inwardly of said ring and having a mold face which corresponds with the product to be produced, and forcing a moldable material within the space provided between said mold member and ring to effect shaping and bonding of the molding material to the inner periphery of said split ring, such material being confined from outflow through the split portion of said ring by means of said dam, and treating said moldable material to effect polymerization and then withdrawing the moldable material and split ring from the mold cavity.

8. A process for producing an article including a split ring and a moldable material bonded thereto, comprising the steps of springing the split ring into the confines of a retaining member having a dam which covers the split portion of said ring, disposing a complementary mold member in relation to said ring to define a mold cavity, and forcing into the mold cavity a quantity of flowable molding material which is bonded to said split ring and is confined against dispersion from said mold through the split ring portion by said dam.

References Cited

UNITED STATES PATENTS 3,063,097  11/1962  Jutzi.

ROBERT F. WHITE, *Primary Examiner.*

T. J. CARVIS, *Assistant Examiner.*